United States Patent [19]

Fontaine

[11] Patent Number: 5,141,361

[45] Date of Patent: Aug. 25, 1992

[54] DOOR SEAL FOR WATER SLIDE GATES

[75] Inventor: René Fontaine, Magog, Canada

[73] Assignee: Ltee H. Fontaine, Quebec, Canada

[21] Appl. No.: 360,433

[22] Filed: Jun. 2, 1989

[30] Foreign Application Priority Data

Jun. 3, 1988 [CA] Canada ............................. 568611

[51] Int. Cl.⁵ ............................................. E02B 7/36
[52] U.S. Cl. ................................ 405/106; 405/104;
405/103; 251/328; 49/482
[58] Field of Search ............... 405/104, 106, 103, 105;
251/326, 327, 328; 49/482, 440, 477, 452, 494

[56] References Cited

U.S. PATENT DOCUMENTS

| | | | |
|---|---|---|---|
| 2,671,540 | 3/1954 | Dakin | 49/452 X |
| 2,700,196 | 1/1955 | Panhard | 49/477 X |
| 2,889,684 | 6/1959 | Abrahams | 405/106 |
| 3,158,961 | 12/1964 | Hawkins | 49/482 X |
| 3,438,150 | 4/1969 | Heim | 49/477 X |
| 4,003,162 | 1/1977 | Britt | 49/482 X |
| 4,177,353 | 12/1979 | McCormack | 49/477 X |
| 4,220,420 | 9/1980 | Aston et al. | 405/104 |
| 4,226,553 | 10/1980 | Whipps et al. | 405/106 |
| 4,524,950 | 6/1985 | Vitas et al. | 251/326 |
| 4,614,061 | 9/1986 | Brocke | 49/490 X |

FOREIGN PATENT DOCUMENTS 0213788  2/1961  Austria ............................. 405/103

Primary Examiner—Dennis L. Taylor
Attorney, Agent, or Firm—Fay, Sharpe, Beall, Fagan, Minnich & McKee

[57] ABSTRACT

A water tight seal for water slide gates, and more particularly to a seal which is made from an elastomer such as reinforced plastic. Said seal comprises a first portion and a second portion whereon slides the gate and a resilient means so as to clasp the gate between said first and said second portions of said seal.

18 Claims, 6 Drawing Sheets

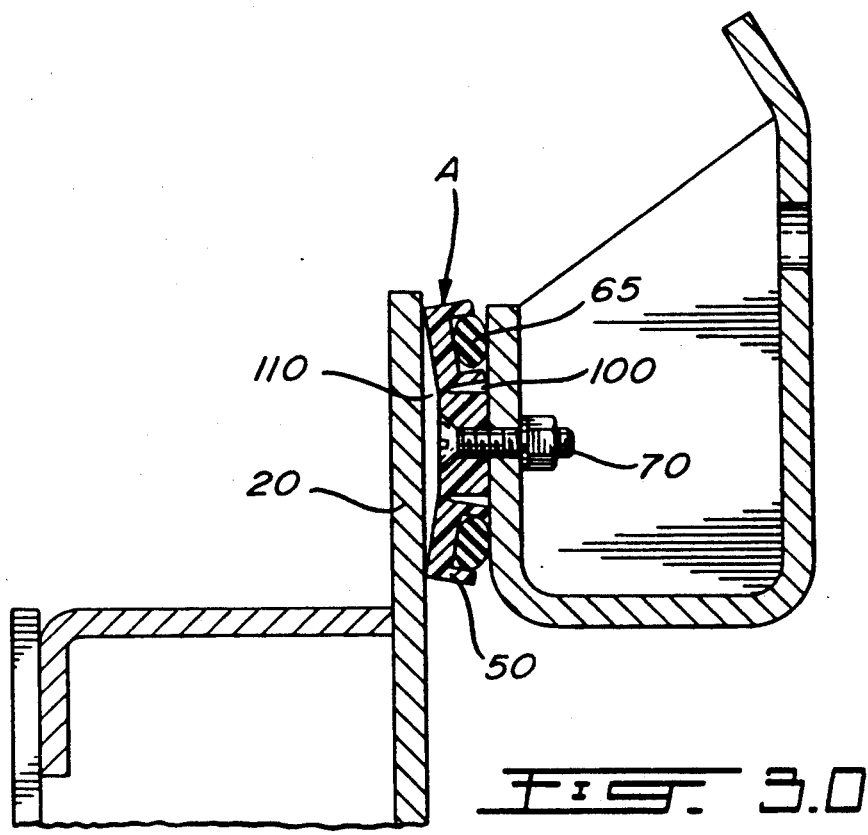
FIG. 3.0
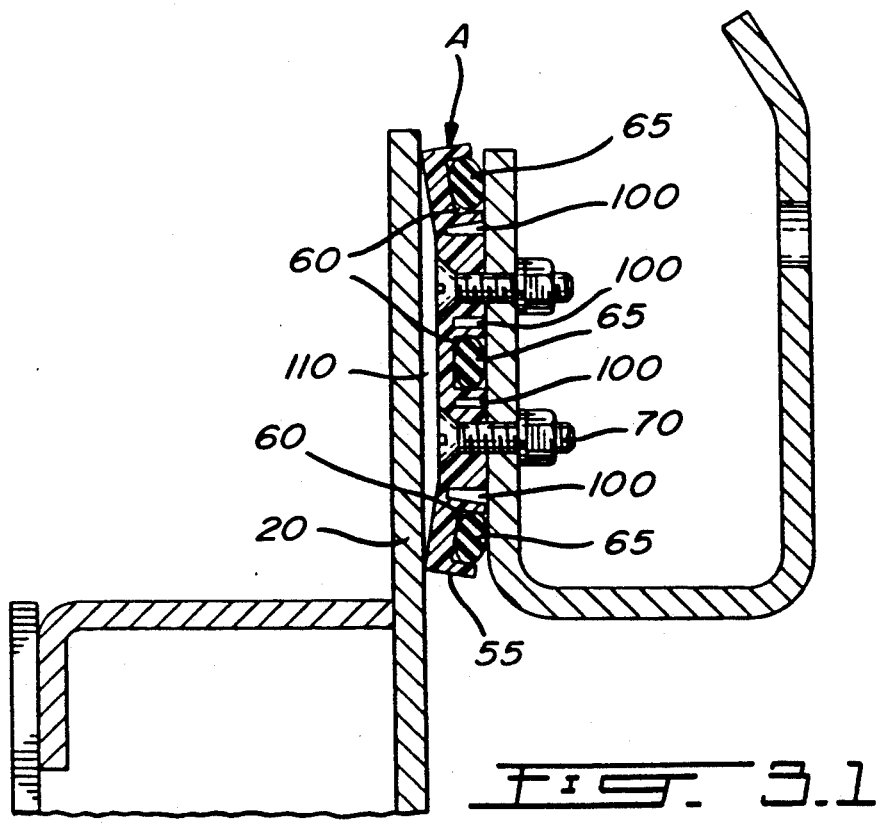
FIG. 3.1

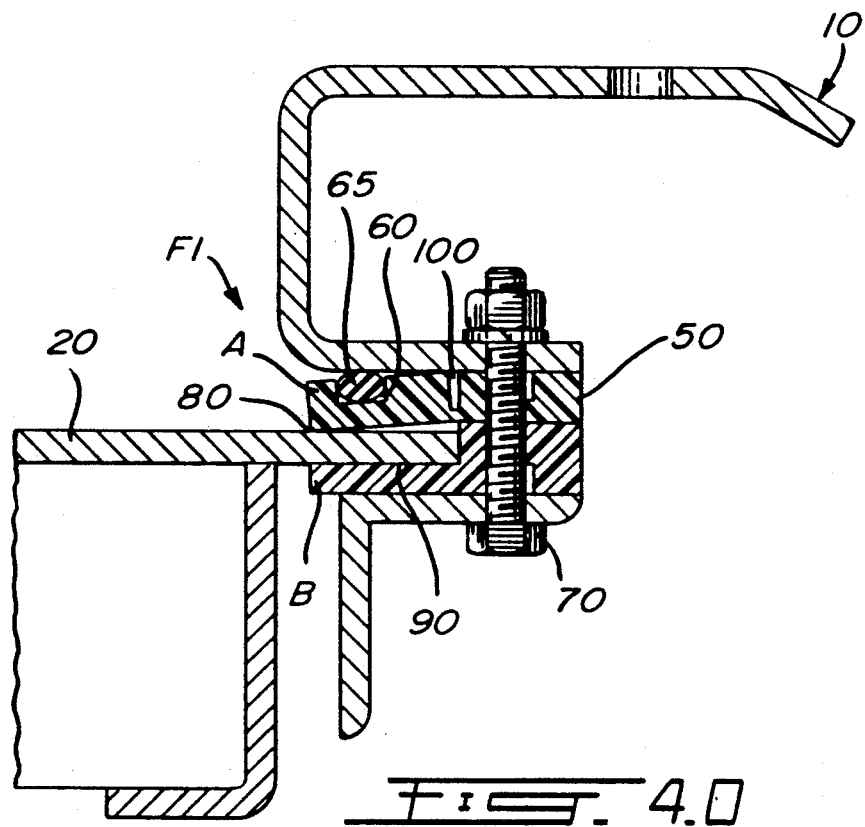
FIG. 4.0
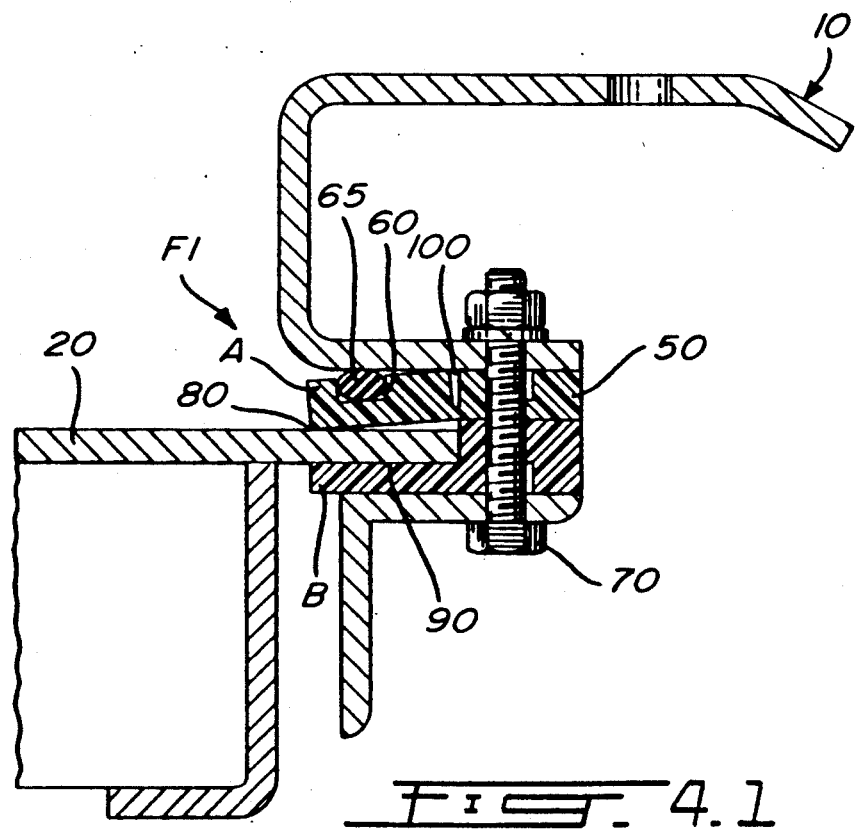
FIG. 4.1

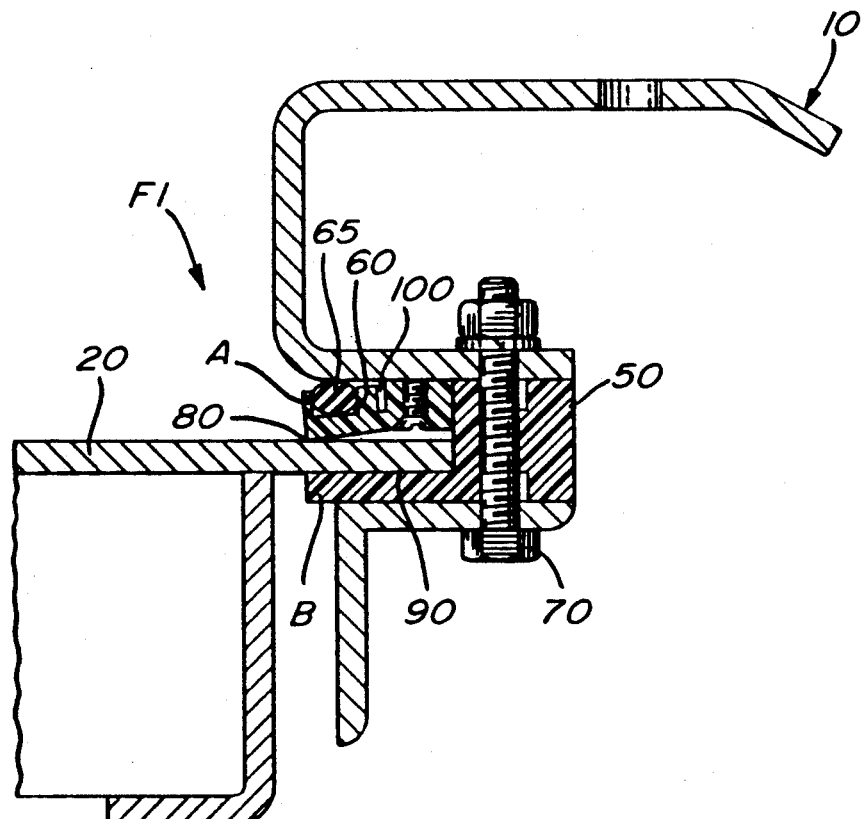
_Fig. 4.2_
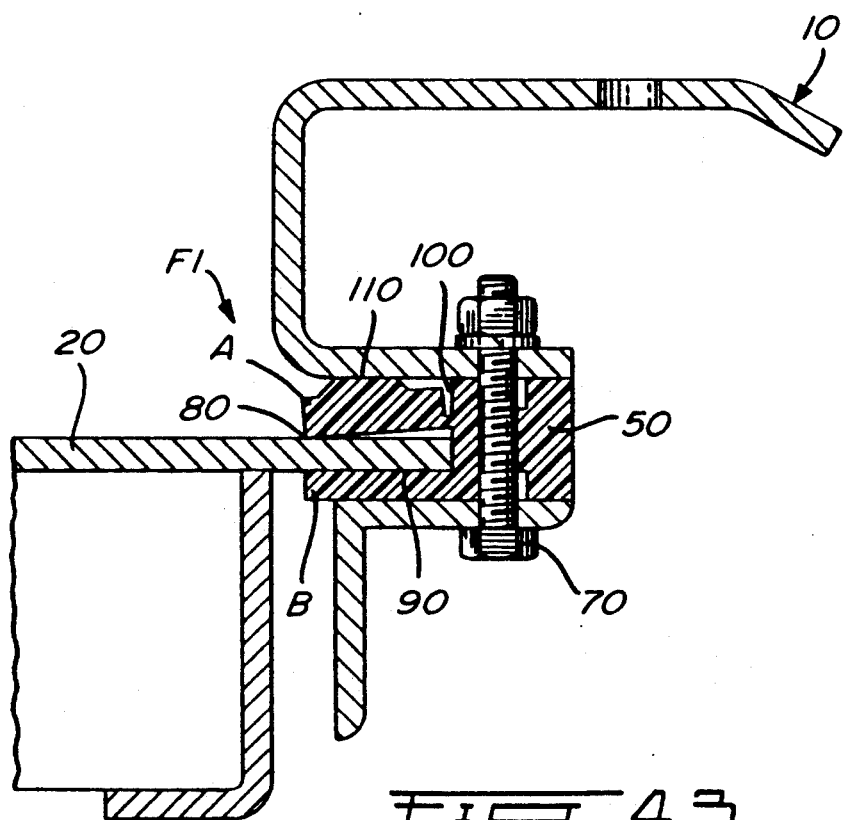
_Fig. 4.3_

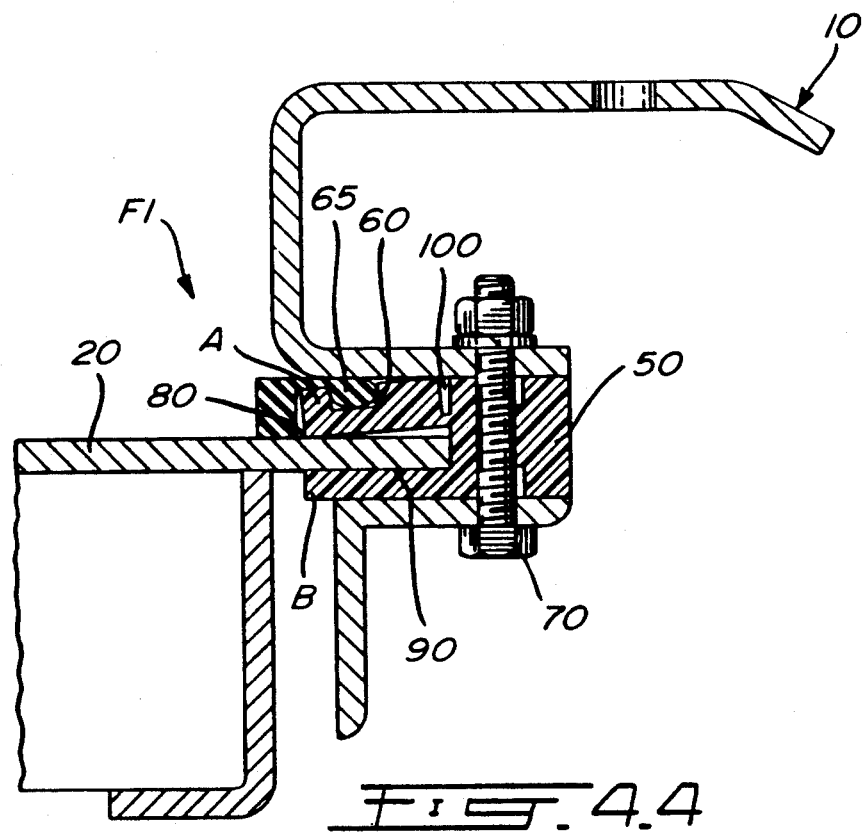
FIG. 4.4
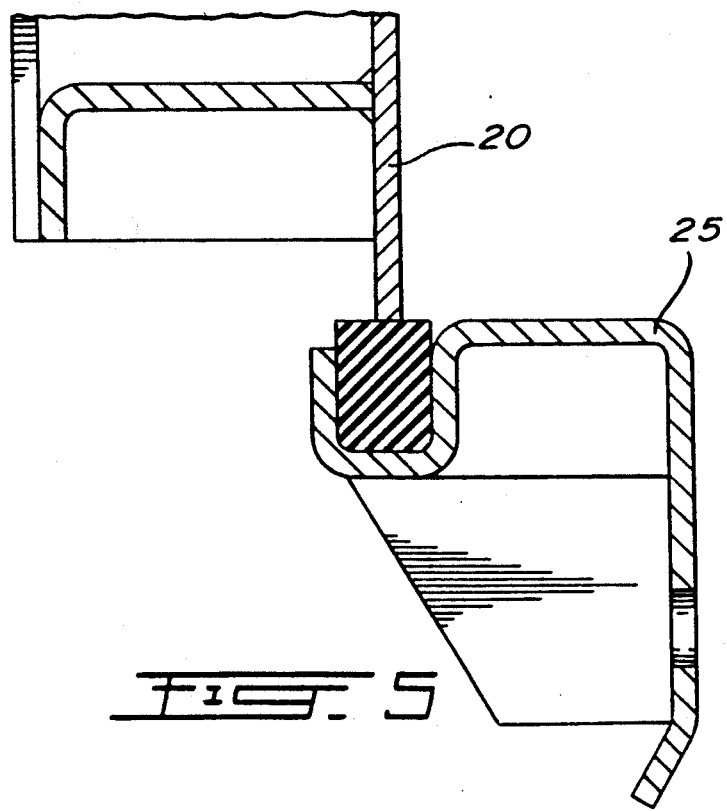
FIG. 5

DOOR SEAL FOR WATER SLIDE GATES

FIELD OF THE INVENTION

A water tight seal for water slide gates, and more particularly a seal which is made from an elastomer such as reinforced plastic.

DESCRIPTION OF PRIOR ART

Water slide gates are widely used for controlling the flow of water or other liquids. For example, they are sometimes used in water works, sewage and treatment plants, control systems and other similar works. However, due to their dimensions, such gates have been difficult to seal, since the pressure due to the head of liquid acting over the area of the gate tends to separate the seal from the gate.

Furthermore, the friction which exists between the sealing arrangement and the gate moving structure tends to increase substantially the force necessary to open the gate.

There exists different types of seal for water slide gate. A few examples are described hereunder:

U.S. Pat. No. 2,889,684 (Abrahams) shows a prefabricated irrigation gate having sealing gasket of U-shape in cross-section. The main drawback of this sealing gasket is that it is not possible to adjust the water tightness of the seal. Furthermore, with the use of a strip of wood, the tightness depends on the moisture in the wood. Finally, with a U-shape configuration, it is not possible to seal the upper portion of the gate.

U.S. Pat. No. 4,220,420 (Aston et al) shows a sealing arrangement for a sluice gate comprising a strip arranged to bear against the door. Said sealing arrangement comprises a mechanism having a set of guide bars to control the movement of the gate. The adjustment of the tightness is achieved by adjusting the position of the guide bar towards and away from the seat. The main drawback of this configuration is that it is difficult to maintain the adjusting mechanism operational in such a rough environment.

U.S. Pat. No. 4,524,950 (Vitas et al) shows an open channel gate valve. Said gate valve comprises a sealing member of truncated V-shape, which engages a seat of truncated V-shape provided on the frame. The principal drawback of this sealing member is that same may have a tendency to wear down due to the repetitive open and close movement of the gate. Even though the gate is provided with bolts which pass through oversize or oblong holes in the seals to permit adjustment, said adjustment is difficult to obtain, especially when there is a large static load due to the head of liquid acting over the other side of the gate.

OBJECTS OF THE PRESENT INVENTION

An object of the present invention is to provide a sealing arrangement which is easy and economical to the manufacture.

Another object of the present invention is to provide a self adjusting sealing arrangement.

Still another object of the present invention is to provide a sealing arrangement which will resist to the flexion caused by static load on the gate.

A further object of the present invention is to provide a sealing arrangement which will require no maintenance.

A still further object of the present invention is to provide a sealing arrangement having no moving parts.

Still another object of the present invention is to provide a sealing arrangement for rising and non-rising gate.

Another object of the present invention is to provide a sealing arrangement which is easy to use for retrofitting on existing gates.

These and other objects of the present invention will be obtained by a seal for a slide gate for liquids having a frame, said seal comprising:
- a first portion, made from a high density plastic or any similar materials, placed on one side of the gate and secured to said frame by bolts and nuts;
- a least one O-ring cord or rubber seal is provided so as to urge the first portion towards said gate at the time the first portion is secured to said frame by said bolts and nuts;
- a second portion, made of high density plastic or any similar materials, placed on the other side of said gate and also secured to said frame.

DESCRIPTION OF THE DRAWINGS

Further objects and advantages of the present invention will be apparent from the following description in the accompanying drawings in which:

FIG. 3.0 is a cross-sectional side view of the upper seal shown in FIG. 2 taken along lines 3—3 of FIG. 1.

FIG. 3.1 is a cross-sectional side view of a second embodiment of the side seal shown in FIG. 3.

FIG. 4.0 is a cross-sectional plan view of the side seal shown in FIG. 2 taken along lines 4—4 of FIG. 1.

FIG. 4.1 is a cross-sectional plan view of a second embodiment of the side seal shown in FIG. 4.0.

FIG. 4.2 is a cross-sectional plan view of a third embodiment of the side seal shown in FIG. 4.0.

FIG. 4.3 is a cross-sectional plan view of a fourth embodiment of the side seal shown in FIG. 4.0.

FIG. 4.4 is a cross-sectional plan view showing a variation of the resilient means shown in FIGS. 2, 4.0, 4.1 and 4.2.

FIG. 5 is a cross-sectional side view of the lower seal shown in FIG. 2 taken along lines 5—5 of FIG. 1.

DESCRIPTION OF A PREFERRED EMBODIMENT

Figure 1:
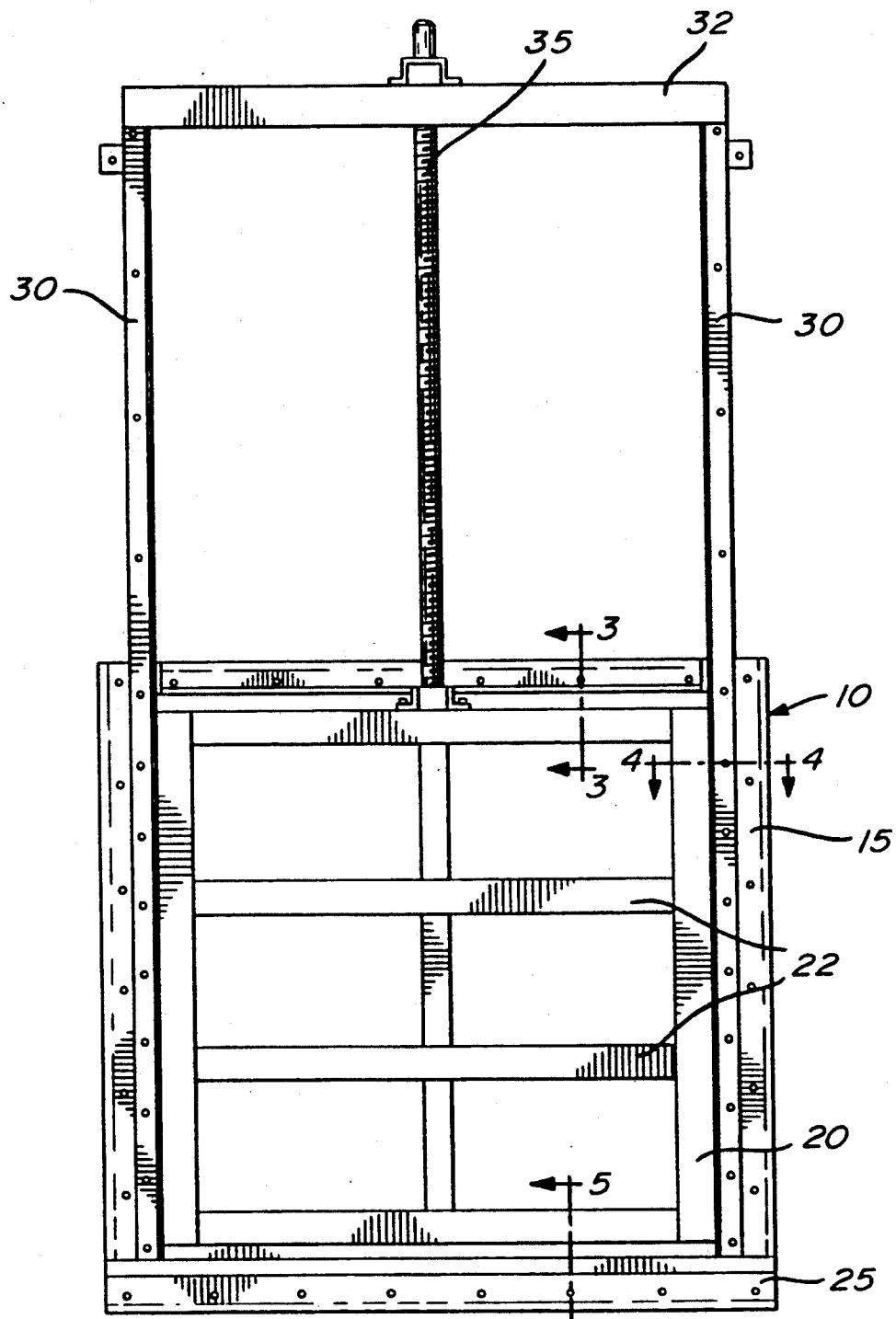
FIG. 1 is a front view in elevation of a water slide gate embodying features of this invention.
Figure 2:
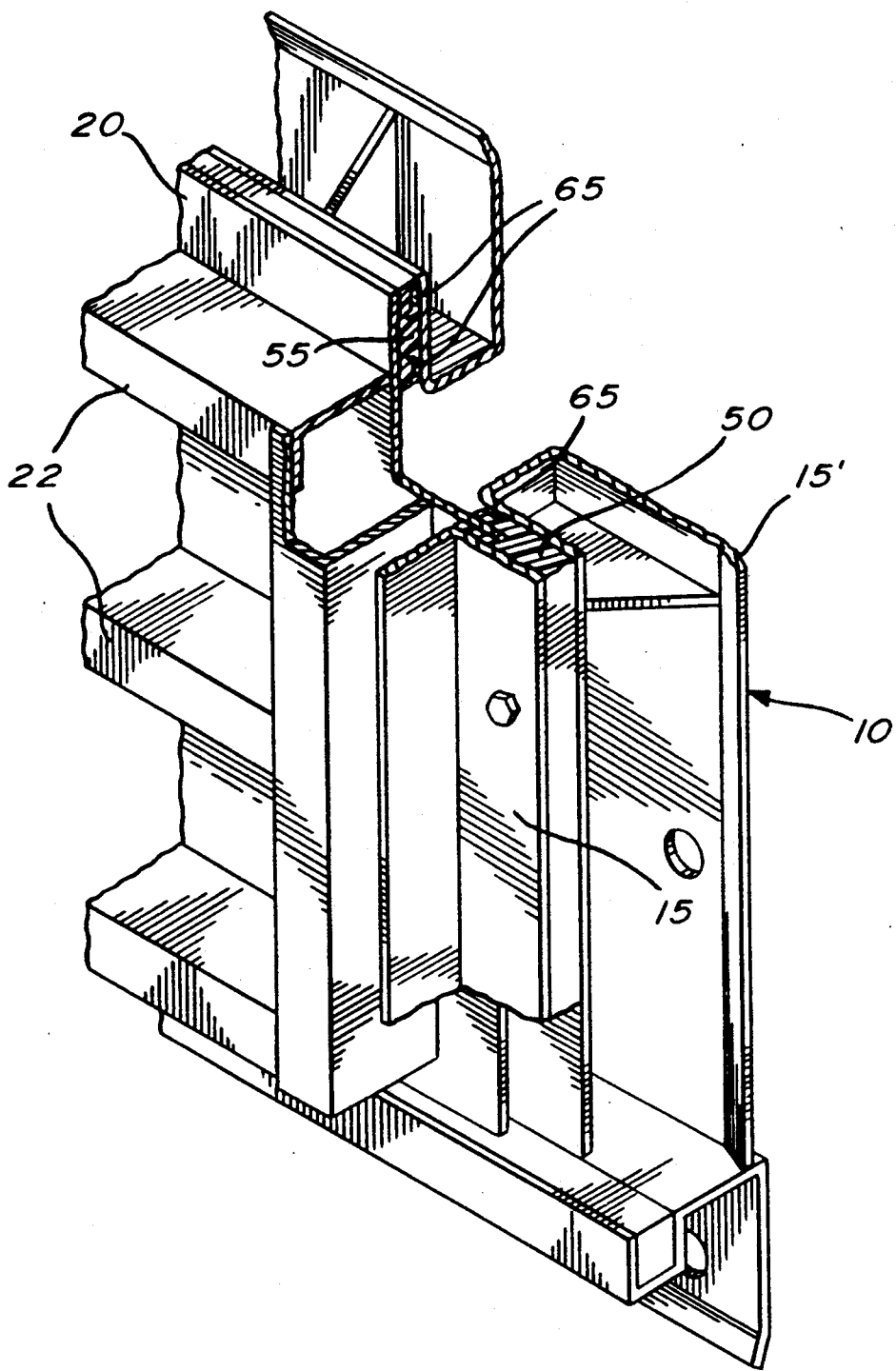
FIG. 2 is a perspective view partially cut away of the slide gate shown in FIG. 1.

A slide gate is shown in FIGS. 1 and 2 and comprises a rectangle metal frame 10 which includes upright vertical sections 15 and a rectangular gate 20. Said gate 20 is preferably provided with door stiffeners 22 and flange back frames 15', which reduce the risk of warping during shipping, handling and installation.

The slide gate can be self contained or provided with an open frame. The self contained gate comprises two vertical slides 30 attached to an horizontal upper yoke 32 which acts as a bearing beam absorbing the vertical force developed during gate operation or as stem guide.

The opened frame gate (not shown) has no horizontal upper yoke 32 and is more suitable for larger dimensions due to the larger forces involved in gate operation.

Gate 20 is raised and lowered by means of the stem 35 mounted on the top of the gate. The mechanism for raising and lowering the gate being well-known to the person skilled in the art, therefore, same will not be described in further details. Gate 20 is preferably constructed of stainless steel since it has to resist to inherent corrosion. However, cast iron can be used for the same purpose.

A cross-member 25 may be provided with a flush closing bottom which eliminates the need for the floor recess required by conventional gates. This way of sealing the lower portion of the gate prevents foreign materials such as gravel, glass or similar material from obstructing the closing of the gate.

Referring now to FIG. 4.0, side seal 50, according to a preferred embodiment of the present invention, is shown. Said seal 50, of generally rectangular shape in cross-section, comprises two sections, A and B. Seal 50 is preferably made of an ultra-high molecular polyethylene, however any similar material can be used for the same purpose. FIGS. 4.1 to 4.2 show other embodiments of the present invention.

Section A has a groove which is referred to as number 60 to receive a resilient means 65 such as an O-ring cord or rubber seal, in order that, when bolts 70 are screwed in the frame 10, edges 80 of said section A are urged towards the gate 20 and therefore, the latter is clasped between said edges 80 and the portion 90 of section B.

To increase the tightness of the sealing arrangement, it is only necessary to tight bolts 70 along the length of sections A and B of seal 50, and this, without the necessity of removing the liquid on the other side of the gate.

The sealing arrangement, referred to as seal 50 in the present description, works as follow:

The O-ring cord or rubber seal 65 is inserted in the groove 60 and secured to same by any appropriate means such as glue. Said O-ring cord or rubber seal 65 is interposed between section A and frame 10 as best illustrated in FIG. 2.

Strips (not shown) of seal 50 are then placed on each side of gate 20 prior to the installation on frame 10.

By using the O-ring cord or rubber seal 65, the thickness of portion of section A is increased, therefore when the seal 50 is bolted on the frame 10, the increased portion tends to flex in the direction illustrated by the arrow F1 clasping gate 20 between section A and B.

Section A is preferably provided with a second groove 100 so as to facilitate the flexibility of same. However, it is to be understood that, if the material used for the seal 50, and more particularly the material used for section A, is sufficiently resilient, groove 100 would not be necessary.

Referring now to FIG. 3, the upper seal 55 has basically the same configuration as the side seal 50, except that there is no section B since, with a rising gate, it is not possible to use the second section B. To increase the tightness of the seal, and to prevent foreign objects from falling into the space 110 between said seal and gate 20, a plurality of O-ring cords or rubber seals can be added to the seal as best shown in FIG. 3.1, however, it has been found that two O-ring cords or rubber seals are sufficient for most applications.

FIG. 4.3 shows a variation of section A of either seal 50 or 55, wherein resilient means 65 as well as groove 60 have been replaced by a portion of increased thickness 110. It should be noted that said portion 110 should be preferably made from a soft resilient material since same is also used as a sealing means between the front vertical frame 15 and the rear vertical frame 15'.

Since portions 80 and 90 of respectively section A and section B are made from ultra high density plastic and constitute anti-friction means for sliding door 20, it is not necessary to unscrew bolts 70 when rising said door.

FIG. 4.4 shows a variation of the O-ring cord or rubber seal, same is used to prevent foreign objects from penetrating in the space defined between sections A and B.

FIG. 5 shows the lower seal for the bottom part of the door. Said seal comprises a resilient means such as an O-ring cord or rubber seal similar to resilient means 65 and same is arranged to co-operate with door 20.

It is to be understood that various modifications, additions, changes and variations may be made to this seal without departing from the spirit and scope of the invention. For example, section B of seal 50 may also be provided with an O-ring cord or rubber seal 65 to urge edges 80 of said section towards the gate 20.

We claim:

1. A seal for a slide gate for liquids, the slide gate being adapted for displacement within a frame, said seal being adapted for sides of the gate extending parallel to a direction of displacement of the gate, said seal being of general U-shaped cross-section and comprising first and second sections extending on one side and the other of the gate and secured to the frame by securing means positioned outwards of the gate; said seal also comprising at least one urging means interposed between said first section and the frame opposite the gate and remote from said securing means for urging at least a longitudinal edge of said first section against the gate when said securing means exerts a sufficient pressure on said first section.

2. A seal according to claim 1, wherein said securing means extends through said seal to compress the same, with said urging means causing a pivot of said first section towards the gate.

3. A seal according to claim 1, wherein said securing means is adapted to impart on said seal forces for adjusting the tightness of the seal on the gate.

4. A seal according to claim 1, wherein said urging means is a resilient means.

5. A seal according to claim 4, wherein the resilient means is an O-ring.

6. A seal according to claim 1, wherein said first section is made from a high density plastic.

7. A seal according to claim 1, wherein said second section is made from a high density plastic.

8. A seal according to claim 1, wherein said first section is integral with said second section.

9. A seal according to claim 3, wherein said securing means are bolts.

10. A seal according to claim 4, wherein said resilient means is at least partly disposed in a channel defined in said first section.

11. A seal for a slide gate for liquids, the slide gate being adapted for displacement within a frame, said seal being adapted for a side of the gate extending at right angles to a direction of displacement of the gate said side being parallel and opposite another side of the gate resting at the bottom of the frame when the gate is closed, said seal comprising a main body located between the gate and the frame and secured at a central portion thereof to the frame by securing means; said seal also comprising at least two urging means interposed on each side of said central portion between said main body and the frame opposite the gate and remote from said securing means for urging at least two longitudinal edges of said main body against the gate when said securing means exerts a sufficient pressure on said central portion.

12. A seal according to claim 11, wherein said securing means extends through said central portion of said seal to compress the same, with said urging means causing pivots of said main body towards the gate.

13. A seal according to claim 12, wherein said securing means is adapted to impart on said seal various forces for adjusting the tightness of the seal on the gate.

14. A seal according to claim 11, wherein both said urging means are resilient means.

15. A seal according to claim 14, wherein each said resilient means is at least partly disposed in a channel defined in said main body.

16. A seal according to claim 11, wherein each said resilient means is an O-ring.

17. A seal according to claim 11, wherein said main body is made from a high density plastic.

18. A seal according to claim 13, wherein said securing means are bolts.

* * * * *